(12) United States Patent
Nakada et al.

(10) Patent No.: US 6,360,105 B2
(45) Date of Patent: Mar. 19, 2002

(54) PORTABLE TELEPHONE

(75) Inventors: Shinichi Nakada; Mamoru Tsumuraya, both of Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/834,806

(22) Filed: Apr. 12, 2001

Related U.S. Application Data

(63) Continuation of application No. 09/040,863, filed on Mar. 18, 1998, now Pat. No. 6,243,592.

(30) Foreign Application Priority Data

Oct. 23, 1997 (JP) .............................................. 9-291295

(51) Int. Cl.[7] ................................................ H01Q 1/24
(52) U.S. Cl. ........................ 455/550; 455/414; 455/575
(58) Field of Search ......................... 455/550, 90, 327, 455/277.1, 41, 572, 575, 414, 95, 97; 361/814; 343/700, 702, 841

(56) References Cited

U.S. PATENT DOCUMENTS

| | | | |
|---|---|---|---|
| 4,491,978 A | 1/1985 | Nagata et al. ............... | 455/338 |
| 5,079,559 A | 1/1992 | Umetsu et al. ............. | 343/702 |
| 5,142,698 A | 8/1992 | Koga et al. .................. | 455/327 |
| 5,216,434 A | 6/1993 | Fukumura ................. | 455/277.1 |
| 5,437,057 A | 7/1995 | Richley et al. ................ | 455/41 |
| 5,517,676 A | 5/1996 | Sekine et al. .................. | 455/89 |
| 5,940,040 A | 8/1999 | Koyanagi et al. ........... | 343/702 |
| 5,940,745 A | 8/1999 | Imura ........................... | 455/90 |
| 5,987,337 A | 11/1999 | Takaya ....................... | 455/572 |

*Primary Examiner*—Daniel Hunter
*Assistant Examiner*—Thuan T. Nguyen
(74) *Attorney, Agent, or Firm*—Hogan & Hartson, LLP

(57) ABSTRACT

A digital portable radio having a plane antenna, which minimizes the area of a board occupied by a built-in antenna without deteriorating gain. More specifically, a built-in antenna radiation element having a conductor capable of being electrically connected to a power feed circuit provided on the circuit substrate is fixed on the internal wall of the casing. A built-in antenna which accomplishes high gain and occupies a small area is obtained. Further, the antenna radiation element is formed from a metal plate and has a branch where one end of a longer radiation element formed from a thin metal plate is connected to one end of a shorter radiation element, and the other end of each of the radiation elements is open. Further, gap is formed by bringing the open end of the longer radiation element in close proximity to the open end of the shorter radiation element. Impedance matching is accomplished by utilization of coupling capacitance developed in the gap. The antenna radiation element becomes a quarter $\lambda$ non-grounding multiple resonance built-in antenna by feeding of power to the branch. This antenna is fitted on the internal wall of the casing of the portable radio.

6 Claims, 3 Drawing Sheets

PORTABLE TELEPHONE

This is a continuation of application Ser. No. 09/040,863 filed March 18, 1998, now Pat No. 6,243,592 allowed, which application is hereby incorporated by reference in its entirety.

BACKGROUND OF THE INVENTION

The present invention relates to a portable radio, such as primarily a digital portable telephone having a built-in plane antenna, and more particularly to the space-saving structure of the built-in antenna. Further, the invention relates to a plane antenna which is mainly used in a digital portable radio (a portable telephone).

A plane antenna has been widely used as a built-in antenna of a digital portable telephone because of its advantages of compactness and high gain. The built-in antenna of the portable telephone is directly mounted on a circuit substrate.

In recent years, a portable telephone market has spread into wide use, and the portable telephone is miniaturized so as to sufficiently fit in a pocket. The portable telephone tends to be miniaturized further. In conjunction of miniaturization of the portable telephone, there is also a demand for a reduction in the space occupied by the built-in antenna attached to the portable telephone.

However, if the size of the portable telephone is reduced further, it becomes difficult to ensure space for the built-in antenna. This is because as the size of the case is reduced, a circuit originally made up of a plurality of circuit boards is constituted of only one board. In addition, the circuit board itself becomes more compact. For these reasons, the electronic components are mounted on the circuit board in high density. Accordingly, the space required to mount the built-in antenna on the board is reduced, the antenna must be formed in small size. In general, a small-sized antenna entails the deterioration of gain, which in turn may result in a drop in the performance of the portable telephone. However, if an attempt is made to increase the size of the built-in antenna, it becomes impossible to store an electronic circuit in the case.

Aside from the foregoing problem, there is a lot of talk about the problem related to a line. More specifically, the frequency of utilization of a line is increased in proportion to an increase in the number of portable telephones, and is traffic becomes nearly full. The number of circuit lines is increased by utilization of a frequency range of the analog portable telephone as measures against the increase in the traffic. However, this method requires two receiving ranges. It is impossible to provide an existing built-in antenna having a narrow range with the sensitivity which covers two ranges. Therefore, there is needed an antenna which produces two resonance ranges (or multiple resonance) and has sensitivity over two ranges.

SUMMARY OF THE INVENTION

To solve the foregoing problem and to minimize the area occupied by a board of a built-in antenna without deterioration of a gain, a radiation element of a built-in antenna is mounted on an internal wall of a case, and a conductor is provided which is capable of electrically connecting the radiation element to a power feed circuit provided on the board, thereby providing a built-in antenna which achieves high gain and requires the space occupied by the circuit board.

To ensure sensitivity over to receiving ranges, an antenna radiation element is provided with a branch where one end of a longer radiation element is connected to one end of a shorter radiation element. The other ends of the longer and shorter radiation elements are open ends and are positioned in close proximity to each other so as to form gap between them. Impedance matching is accomplished by means of the mutual coupling capacitance developed in the gap, and power is fed to the branch.

DETAILED DESCRIPTION OF THE PREFERRED EMBODIMENTS

Embodiments of the present invention will be described herein below.

Embodiment 1

Figure 1:
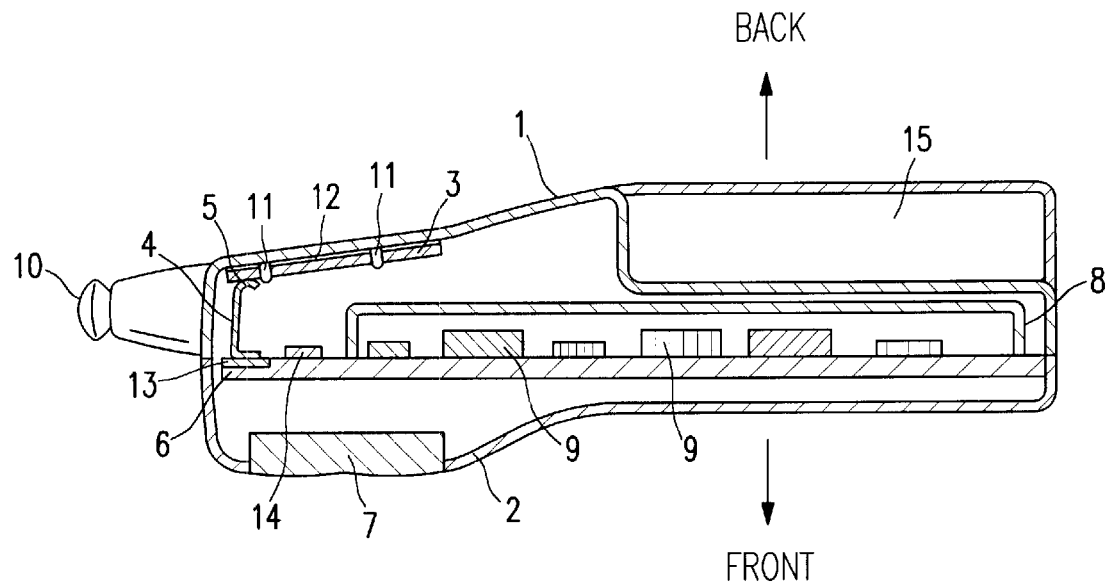
FIG. 1 is a side cross-sectional view showing a portable radio according to a first embodiment of the present invention.

FIG. 1 is a side cross-sectional view showing a case of a portable radio according to the present invention. In FIG. 1, a portion of the case located in an upper area of the drawing sheet designates the back of the case, whereas a portion of the case located in a lower area of the drawing sheet designates the front of the case. Reference numeral 1 designates a plastic rear case which constitutes the back of the case; and 2 designates a front case which constitutes the front of the case. Reference numeral 3 designates a plane antenna radiation element made of thin metal plate. Reference 4 designates a power feed terminal; 5 a contact; 6 a circuit board; 7 an LCD; 8 a shield case used for the purpose of electromagnetic shielding; 9 an RF circuit; 10 an extendable transmit/receive antenna capable of being housed or extended; 11 a protuberance used for the purpose of positioning the antenna radiation element 3; 12 a double-sided table used for fixing the antenna element 3 on the internal wall of the rear case 1; 13 designates a power feed land; 14 a digital circuit component; and 15 a replaceable battery.

The antenna element 3 is formed from a thin metal plate (having a thickness of about 0.1 mm) composed of phosphor bronze. The antenna element 3 is a radiation element having a quarter-wavelength electrical length such as that causes the antenna to resonate in a receiving area so as to be able to receive an electronic wave transmitted from a base station, thereby constituting a quarter $\lambda$ (wavelength) non-contact antenna. Several holes are formed in the antenna radiation element 3, and the positioning protuberance 11 of the rear case 1 is fitted into one of the holes at the time of assembly of a radio, thereby positioning the antenna element 3.

The somewhat large power feed land 13 formed on the circuit board 6 is connected to a receiving circuit (not shown) via an unillustrated power feed circuit and an unillustrated matching circuit. The power feed terminal section 4 is made of electrically conductive material and is soldered to the power feed land 13. The contact 5 comes into an appropriate position of the antenna radiation element 3 under pressure, thereby maintaining conduction of electricity. The reason for this is that the rear case 1 is assembled or disconnected from the portable radio without difficulties.

With the foregoing construction, the antenna radiation element 3 mounted on the internal wall of the rear case 1 produces resonance with respect to a ground (or an internal layer) of the circuit board 6 positioned below the antenna radiation element 3. The electric power thus received enters the receiving circuit via the power feed terminal 4, the power feed land 13, and the power feed line.

As can be seen from the foregoing description, the antenna radiation element 3 is not directly positioned on the circuit board 6 and is fixedly fitted on the internal wall of the rear case 1 within the area occupied by the built-in antenna made up of the antenna radiation element 3 positioned above the circuit board 6. Therefore, only the power feed terminal 4 of the circuit board 6 is associated with the built-in antenna, and hence the area of the circuit board 6 occupied by the built-in antenna is considerably reduced. Eventually, the space of the circuit board 6 is correspondingly increased. So long as a component has a small height such as a digital circuit component 14, any component can be positioned on the circuit board 6 immediately below the antenna radiation element 3.

Since the antenna radiation element 3 uses the internal wall of the rear case 1, the element is not subjected to space limits. Because of this, the antenna radiation element 3 can be formed into a big size, thereby resulting in an increase in gain.

Even in the following respects, the increase in the size of the antenna radiation element 3 exerts a good influence on an increase in gain. There is a tendency for gain to increase as the distance between the ground and the radiation element is increased. Since the present invention eliminates a gap between the antenna radiation element 3 and the rear case 2, the distance between the circuit substrate 6 (ground) and the antenna radiation element 3 becomes the maximum height which the portable radio can accomplish, thereby enabling a significant increase in gain. Further, since the antenna radiation element 3 is formed from a thin metal plate in the present invention, the gain is prevented from being deteriorated by a dielectric loss.

Further, since the antenna radiation element 3 is formed from a metal plate, the outer shape of the antenna radiation element 3 can be accurately formed, enabling prevention of irregularities in the outer shape.

The positioning protuberance 11 is formed on the rear case 1 as means for positioning the antenna radiation element 3 on the rear case 1 in the previous embodiment, and the holes corresponding to the positioning protuberance 11 are formed in the antenna radiation element 3 in order to position the antenna radiation element. However, the positioning means is not limited to the foregoing holes and the protuberance. Guide means, such as lines or grooves, may be formed in the rear case 1 so as to correspond to the outer shape of the antenna radiation element 3.

Further, the power feed terminal 4 may be a conductor of any shape, so long as the terminal may electrically connect the antenna radiation element 3 to the power feed land 13. The power feed terminal 14 may be formed into a spring or a leaf.

Finally, because the antenna radiation element 3 is formed from a light-weight thin metal plate, the antenna radiation element 3 is bonded to the internal wall of the rear case 1 by means of the double-sided tape 12 in the previous embodiment. However, the fixing means is not limited to the double-sided tape. The antenna radiation element 3 may be bonded to the internal wall by means of an adhesive. Alternatively, the positioning protuberance 11 may be thermally fused and pushed to thereby extend the size of the protuberance, whereby the antenna radiation element 3 may be fixed by the protuberance.

In an example in which the present embodiment is applied to a digital portable telephone which operates in a band of 800 MHz, the area of the circuit board 6 occupied by the power feed terminal 4 measures 5×4 mm (length and width) and is considerably smaller than that required by a conventional portable telephone. Since the antenna radiation element itself utilizes the internal wall of the rear case, the antenna radiation element can be formed to a size of 24 mm×24 mm×7 mm (length×width×height from the ground). In contrast with the conventional antenna radiation element having a limited size, the antenna radiation element can be formed in large size.

Embodiment 2

Figure 2:
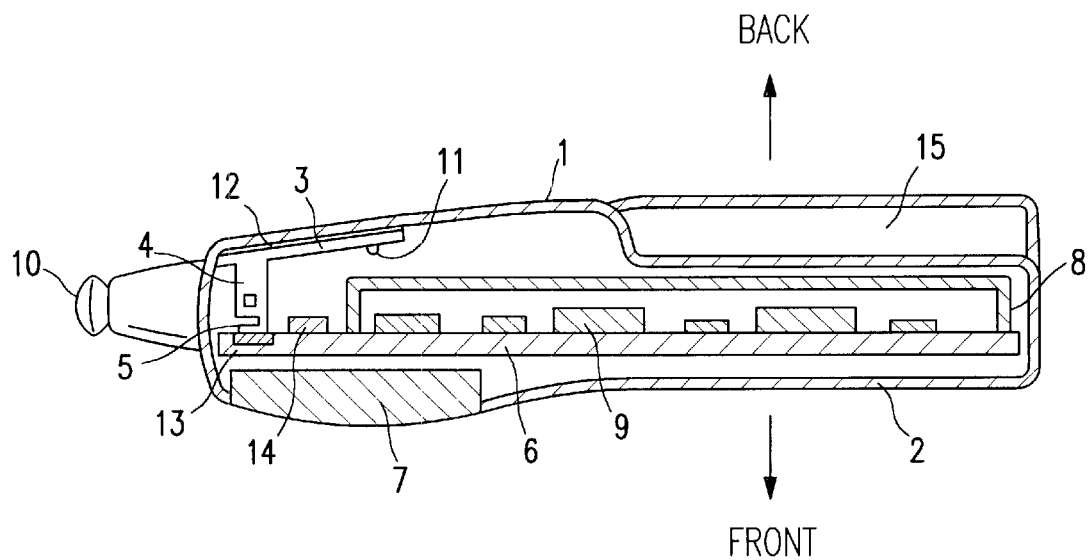
FIG. 2 is a side cross-sectional view showing a portable radio according to a second embodiment of the present invention.

FIG. 2 shows a second embodiment of the present invention. The elements which are the same as those of the first embodiment will be assigned the same reference numerals, and their explanations will be omitted. As is obvious from FIG. 2, the portable radio according to the second embodiment is different from that according to the first embodiment in the structure of the power feed terminal 4. However, the portable radio according to the second embodiment achieves high gain, as does the portable radio according to the first embodiment. In the case of the portable radio according to the first embodiment shown in FIG. 1, in consideration of mass production of the portable radio, a retaining tool is required to retain the power feed terminal 4 in such a way that the power feed terminal 4 can come into contact with the antenna radiation element 3 at the time of assembly of the portable radio. As a matter of course, such a retaining tool occupies a slight area of the circuit board 6.

To solve this problem, in the second embodiment, a portion of the thin metal plate forming the antenna radiation element 3 is bent, so that the power feed terminal 4 is integrally formed. The tip end of the power feed terminal 4 is further bent so as to form the contact 5. When the circuit board 6 is attached to the rear case 1 at the time of assembly of a radio, the contact 5 resiliently comes into contact with the power feed land 13 of the circuit board 6 under pressure and is electrically connected to the circuit on the circuit board 6.

As mentioned previously, it is only essential that the power feed terminal 4 be formed by processing a thin metal plate. If a portion of the antenna radiation element 3 formed from a thin plane metal plate is bent so as to form the power feed terminal 4, the power feed terminal 4 can be formed integrally with the antenna radiation element 3. With such a construction, both the antenna radiation element and the power feed terminal can be formed from the same material. Since it is only add a bending operation to the manufacture of the antenna radiation element, the superior productivity of the portable radio can be achieved. The power feed terminal 4 may be formed into any shape, so long as the electrical connection between the antenna radiation element 3 and the power feed land 13 is maintained when the rear case 1 is mounted on the circuit board 6.

The antenna radiation element 3 can be soldered integrally to the power feed terminal 4. The power feed terminal 4 may be formed from a conductor of any shape, such as a spring or a leaf spring, so long as the antenna radiation element 3 can be electrically connected to the power feed land 12.

In one example in which the second embodiment is applied to a digital portable telephone which operates in a band of 800 MHz, only the power feed land 13 occupies the area measuring 6×3 mm (length×width) on the circuit substrate 6 of the built-in antenna. No other constituent elements associated with the antenna radiation element 3 are disposed on the circuit board 6, thereby minimizing the occupied area of the circuit board. In comparison with the area occupied by the power feed land 13 in the first embodiment, the area occupied by the same can be reduced further in the second embodiment.

As mentioned previously, only the power feed land occupies a part of the area of the circuit board, and the need to place other constituent elements associated with the built-in antenna on the circuit board 6 is completely eliminated, thereby effectively reducing the size of the portable radio having a built-in antenna.

As mentioned previously, according to the present invention, it is possible to implement a built-in antenna which occupies a smaller area of the circuit board of the portable radio and achieves high gain. Further, a built-in antenna is positioned on the internal wall of the casing of the radio, and other components can be arranged on the circuit board in the space of the circuit board formed immediately below the built-in antenna. As a result, the size of the circuit board; namely, the size of the portable radio, can be readily reduced.

Embodiment 3

With regard to a plane antenna housed in a casing of a portable radio, there is formed a quarter λ non-grounding multiple resonance antenna comprising an antenna radiation element; a branch where one end of a longer radiation element and one end of a shorter radiation element are connected together; the other ends of the longer and shorter radiation elements which are formed into open ends and are brought into close proximity to each other so as to form a gap; and coupling capacitance which develops in the gap and is used for impedance matching. Power is fed to the branch. Such an antenna radiation element is positioned on the internal wall of the casing of the portable radio, and the branch of the antenna radiation element is electrically connected to the power feed circuit provided on the circuit board within the casing. A ground is formed as power feed means in the circuit board within the casing. Power is fed to the branch by the power feed means, so that the antenna radiation element produces multiple resonance between the branch and the ground of the circuit board. Further, the power feed means has resilience and comes into elastic contact with the branch. In order to place the antenna radiation element in a predetermined position on the internal wall of the casing, antenna positioning means is provided in a predetermined location on the internal wall of the casing. A protuberance is used as antenna positioning means, and in such a case a hole is formed in the antenna radiation element.

Figure 3:
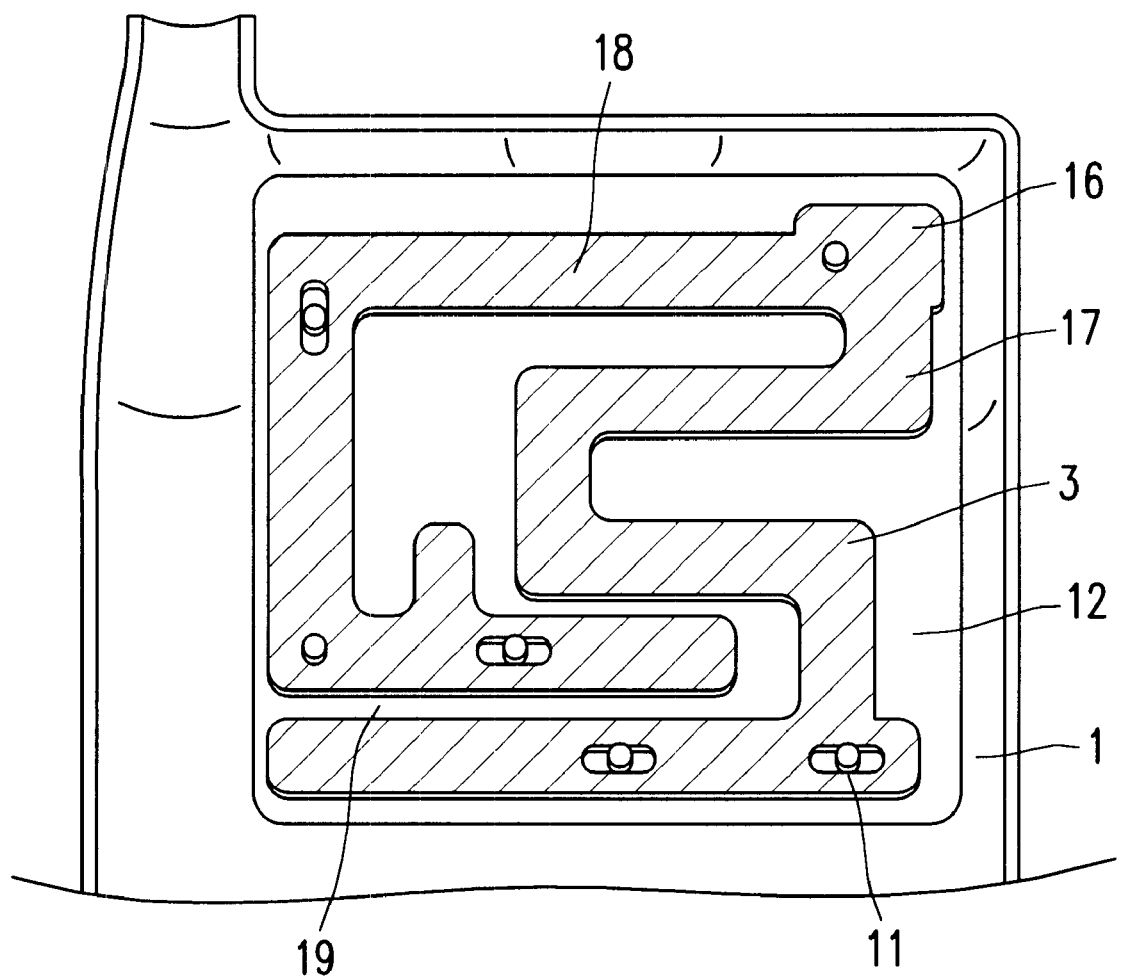
FIG. 3 is a front view showing an antenna radiation element according to the third embodiment of the present invention.

FIG. 3 is a front view showing the antenna radiation element 3 mounted on the rear case 1, which has a branched shape and is made of a thin metal plate. Reference numeral 17 designates a longer radiation element section; 18, a shorter radiation element section; 16, a branch formed by connection of the radiation elements 17 and 18; and 19, a gap as a result of the open ends of the radiation elements 17, 18 coming in proximity to each other.

The antenna radiation element 3 is formed from a thin metal plate (having a thickness of about 0.1 mm) composed of phosphor bronze. The antenna radiation element 3 comprises a longer radiation element 17 having a length to produce resonance in a lower frequency range of two receiving ranges and a short radiation element 18 having a length to produce resonance in a higher frequency range. One end of each of the radiation elements 17, 18 is connected to the branch 16, and the other end of each of the radiation elements is open. The antenna radiation element 3 as a whole has a branched shape, and a plurality of small holes are formed in the antenna radiation element 3 so as to fittingly receive the positioning plastic protuberances 11 formed on the rear case for the purpose of positioning. As a result of power being fed to the branch 16, the antenna radiation element is capable of producing multiple resonance in two receiving ranges so as to be able to receive two different waves transmitted from the base station.

The somewhat large power feed land 13 formed on the circuit board 6 is connected to a receiving circuit (not shown) via a power feed circuit (not shown) and an unillustrated matching circuit. The power feed terminal section 4 is made of electrically conductive material and is soldered to the power feed land 13. The contact 5 comes into an appropriate position of the antenna radiation element 3 under pressure, thereby maintaining conduction of electricity. The reason for this is that the rear case 1 is assembled or disconnected from the portable radio without difficulties. In short, the rear case 1 having the antenna radiation element 3 mounted thereon is attached to the front case 2 having the circuit substrate 6 mounted thereon at the time of assembly. The contact 5 of the power feed terminal 4 mounted on the internal circuit board 6 comes into resilient contact with the branch 16 of the antenna radiation element 3.

With the foregoing construction, multiple resonance arises between the antenna radiation element 3 mounted on the internal wall of the rear case 1 by the double-sided tape 12 produces multiple resonance and the ground (or an internal layer) of the circuit board 6 positioned below the antenna radiation element 3. The electric power thus received enters the receiving circuit from the antenna element 3 via the power feed terminal 4, the power feed land 13, and the power feed line. The coupling capacitance is controlled by adjusting the width of the gap developed when the open end of the longer radiation element 17 is brought into close proximity to the open end of the shorter radiation element, thereby achieving optimum impedance matching. As can be seen from the foregoing description, the multiple resonance built-in antenna according to the present invention can be implemented by a simple configuration in which power is fed to the antenna radiation element 3, which is formed from a thin metal plate into a branched shape, via the branch 16. Therefore, the antenna can be switched to a singular resonance type antenna to a multiple resonance antenna by changing merely the shape of the metal plate. Further, the antenna is of non-grounding type, and therefore the need for grounding is eliminated. Accordingly, the power-feed structure can be simplified. As a result, the cost of the portable radio is reduced, and the mass-productivity of the same is improved.

The antenna radiation element 3 is not provided on the circuit board 6 and is fitted on the internal wall of the rear case 1. Consequently, only the power feed terminal is provided on the circuit board 6, and the need of grounding is eliminated. Therefore, the area of the board occupied by the built-in antenna is minimized, and the space of the board is increased correspondingly. A component, such as a digital circuit component 14, can be placed on the board immediately below the antenna radiation element 3, so long as the component has a small height.

The antenna radiation element 3 utilizes the internal wall of the rear case 1, and circuit components do not limit the space for the antenna radiation element 3. The radiation element can be formed into large size, thereby resulting in an increase in gain.

In a portable telephone which is made compact more and more, when the long radiation element 17 and the short radiation element 18 are mounted on the internal wall of the rear case of the portable telephone, the radiation elements are positioned close to each other, resulting in noticeable mutual coupling capacitance. The present invention actively utilizes this coupling capacitance. Even if the radiation elements come into close proximity to each other, impedance matching can be ensured by adjusting the gap to an appropriate value.

The power feed terminal 4 may be a conductor of any shape, so long as the terminal may electrically connect the antenna radiation element 3 to the power feed land 13. The power feed terminal 14 may be formed into a spring or a leaf.

Figure 4A:
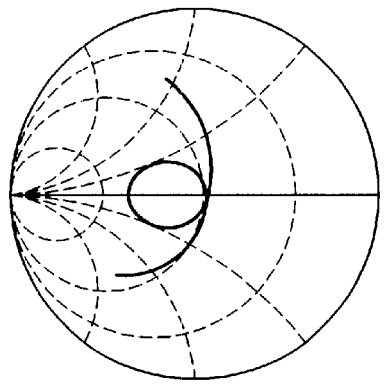
FIGS. 4A to 4C are plots showing the characteristics of the antenna according to present invention.
Figure 4B:
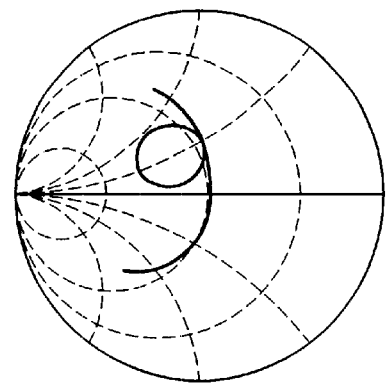
Figure 4C:
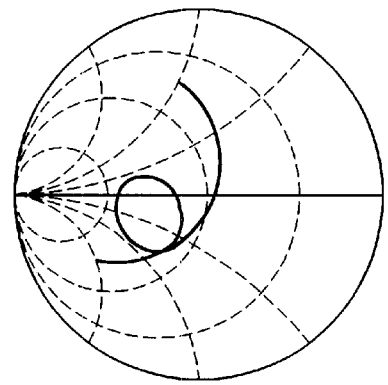

In an example in which the present embodiment is applied to a digital portable telephone which operates in a band of 800 MHz, there are two receiving ranges; namely, a band ranging from 810 to 830 MHz and a band ranging from 870 to 885 MHz. Since the antenna radiation element utilizes the internal wall of the rear case, the antenna radiation element can be formed to a size of 24 mm×30 mm×7 mm (length× width×height from the ground). The area of the circuit board 6 occupied by the power feed terminal 4 measures 5×4 mm (length and width) and is considerably smaller than that required by a conventional portable telephone. Further, FIG. 4A shows the characteristics of impedance matching obtained when the open end of the longer radiation element and a short radiation element is optimized. If the gap is reduced, the state of match is changed to such as that shown in FIG. 4B. In contrast, if the gap is increased, the state of match is changed to such as that shown in FIG. 4C.

present invention can implement multiple resonance and space saving suitable for a portable radio.

What is claimed is:

1. A portable telephone comprising:

a case having a front case and a rear case both made from resin;

circuit board on which a circuit is provided, the circuit board being attached to the case;

an antenna radiation element formed from a thin metal plate, the antenna radiation element being mounted on an internal wall of one of the front case and the rear case and spaced from the circuit board in a direction perpendicular to a main surface of the circuit board; and a power feed terminal which enables an electrical connection between the antenna radiation element and the circuit provided on the circuit board, wherein the power feed terminal electrically connects the antenna radiation element and the circuit provided on the circuit board when the circuit board is attached to the case on which the antenna radiation element is mounted.

2. The portable telephone of claim 1, wherein the power feed terminal is fixed on the circuit board in advance, and the power feed terminal is brought into forced contact with the antenna radiation element mounted on the internal wall of the case when the circuit board is attached to the case.

3. The portable telephone of claim 1, wherein the power feed terminal is integrally formed with the antenna radiation element beforehand, and the power feed terminal is brought into forced contact with a power feed land formed on the circuit board.

4. The portable telephone of claim 1, wherein a positioning proturberance is provided on the internal wall of the case to fix the antenna radiation element on the internal wall of the case, and positioning holes used for receiving the proturberance are formed in the antenna radiation element.

5. The portable telephone of claim 1, wherein the antenna radiation element is mounted on the internal wall of the rear case.

6. The portable telephone of claim 1, wherein a ground of the antenna radiation element is provided with the circuit board.

* * * * *